June 21, 1932.                R. SCHIMPF                1,863,583
GROUND DETECTOR
Filed April 15, 1929
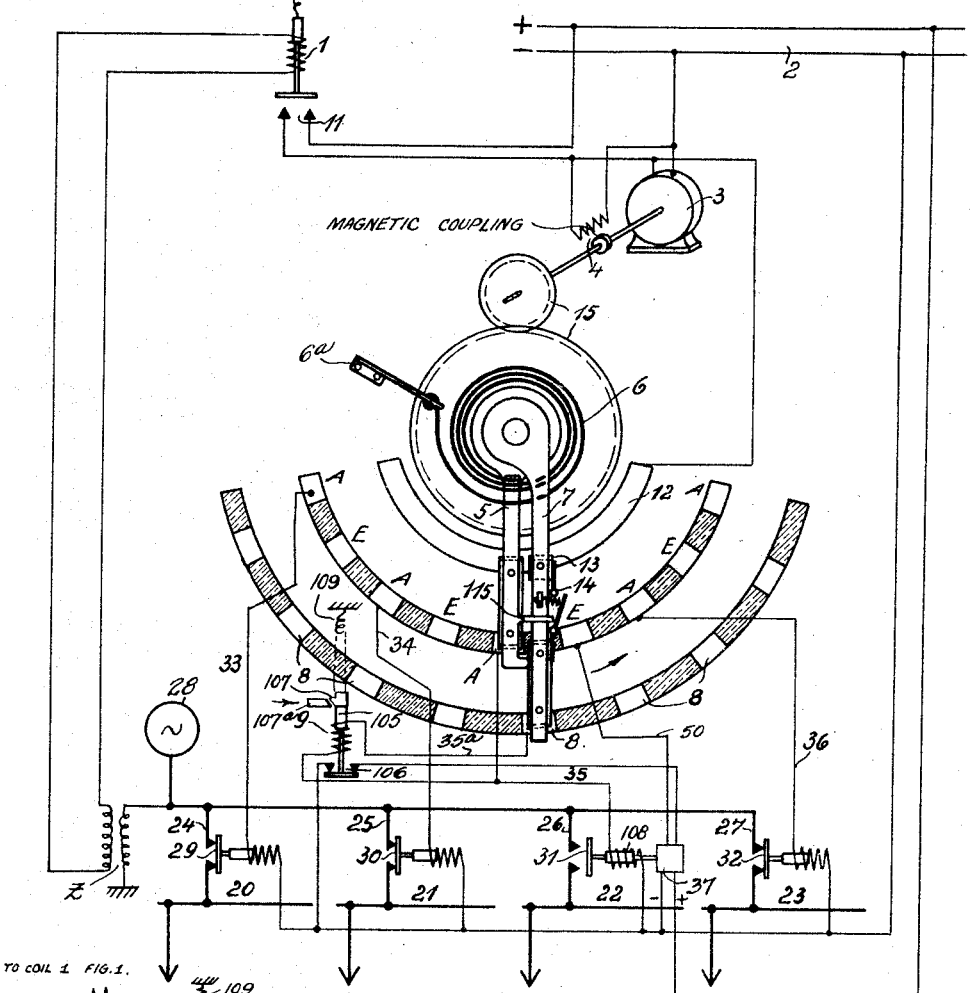
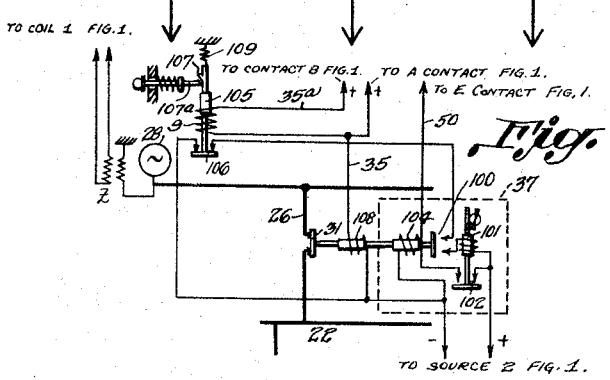
Inventor
Robert Schimpf
by Knight Bro.
Attorneys Patented June 21, 1932

1,863,583

UNITED STATES PATENT OFFICE

ROBERT SCHIMPF, OF BERLIN-SCHLACHTENSEE, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

GROUND DETECTOR

Application filed April 15, 1929, Serial No. 355,360, and in Germany April 23, 1928.

My invention relates to improvements in ground detectors.

It is known in the art to control from a ground leakage supervising device a ground detector, which in a predetermined sequence first cuts out and then in again the individual sections of an electric system. This ground detector thus tests one by one of the individual sections until the faulty section of the electric system is found and cut out. In this way the fault is removed. Since the member which keeps the ground detector in operation, is the ground leakage supervising device itself, the cutting out of the faulty section removes the ground and thus also the impulse for operating the ground detector. The detector thus stops at a place, which indicates the section in which the faulty line is located. Since, however, the device must become operative again for renewed supervision of the other sections in the event of further grounds prevailing or developing in these sections, it is desirable that the detector should be returned into its initial position after the first fault has been removed by the cutting out of the faulty section. In this case the location of the fault can only be ascertained, by ascertaining which circuit breakers have tripped in consequence of the action of the detector. If the circuit breakers are spaced far apart this inspection may involve a considerable waste of time.

The accompanying drawing forming part of my specification illustrates diagrammatically in Fig. 1 the usual system of connection of such apparatus to which my invention is applied, and in Fig. 2 in larger scale certain wiring details of Fig. 1.

Referring to Fig. 1, 1 is the ground leakage supervising relay which is energized from the secondary of a transformer Z, the primary of which is connected to the neutral point of the mains near the generator 28, so that it has applied to it an appreciable potential only when a ground exists in the system. Consequently only in case of a ground, sufficient current will be delivered by the secondary winding to relay 1 to actuate it. Relay 1 operates a switch 11 controlling the current supply from an auxiliary source 2 in such manner that normally, i. e. when no ground fault exists in the system, this switch is open, and in case of a ground fault the switch is closed by the energizing of relay 1 as aforementioned. When switch 11 is closed a circuit is closed containing auxiliary source 2 and a motor 3 which is now set in operation and which drives the pointer 5 of a testing switch through the simultaneously energized magnetic coupling 4 and a reduction gear 15. As soon as a ground fault occurs anywhere in the system relay 1 is energized, switch 11 is closed and the pointer 5 sweeps over a contact rail across the various opening (A) and reclosing (E) contacts for the oil circuit breakers of the individual sections of the system, until the ground has disappeared. The power distributing system itself which is to be supervised is indicated by its individual sections 20, 21, 22 and 23. It is supplied by feeders 24, 25, 26 and 27 from the generator 28. In the feeders are connected circuit breakers 29, 30, 31 and 32, the tripping coils of which are operated through lines 33, 34, 35 and 36 connected to the respective opening contacts (A) of the detector.

In the following further description the circuits and their pertaining devices are described only with reference to the line section 22, for which the complete circuits are shown in the drawing, it being understood that the other line sections are provided each with similar circuit arrangements, which come into operation when the switch arm encounters the pertaining contacts of the group A of these other sections. Tracing the arrangement now further with reference to section 22, the breaker 31 is controlled by a breaker coil 108, which is energized in a circuit including wire line 35, the pertaining A-contact on the detector, the detector arm 5, contact rail 12, common supervising switch 11 and the auxiliary current source 2. As soon as the arm arrives at this pertaining A-contact, the breaker is thrown open. If the section 22 does not contain the ground fault relay 1 remains energized, motor 3 continues operating, arm 5 moves on the next E-contact which recloses breaker 31 of section 22 in a manner to be described later, and thence moves on the next A-contact of section 23, to test that section for the ground fault. Contact arm 5 is controlled by a spring 6 which always tends to return this arm to the left against its stop 6ᵃ. Gearing 15 is connected to motor 3 by a magnetic clutch 4 which is energized from source 2 and also controlled by switch 11. If the ground fault should be in section 22 and is removed, as by opening the breaker, relay 1 becomes immediately deenergized and switch 11 opens, whereby the current supply to motor 3 and the magnetic clutch 4 is cut off so that gearing 15 becomes uncoupled from the motor, and spring 6 is free to return arm 5 to the left against stop 6ᵃ. Aside from the contact rail containing the A and E groups of contacts, the detector is provided with another contact rail containing the insulated contacts 8, each of which contacts is connected to an individual switch relay 9 of the several sections. In Fig. 1 only the relay 9 for section 22 is shown. On the shaft of contact arm 5 is loosely mounted a drag contact arm 7 which contacts with its outer end with the rail containing contacts 8, and intermediate its ends with common contact rail 12. Through drag arm 7 current can be supplied to contact 8 and relay 9 by way of a switch 14 on arm 7 when this switch is closed. Ordinarily, however, i. e. so long as arm 5 is in contact with drag arm 7, taking it along to the right, arm 5 impinges on a pin 115 on arm 7 which keeps switch 14 open and normally prevents current from passing through relay 9. If, however, arm 5 has snapped back to its stop 6ᵃ in case the fault is removed by opening the breaker as just described, switch 14 closes and would permit current supply from contact 8 and through relay 9 and breaker coil 108 in series, provided relay switch 11 were closed which occurs under certain conditions as we shall see later. Drag arm 7 thus remains on the section contact (such as 8 for section 22 in the present case) while arm 5 snaps back to its stop 6ᵃ. The position of arm 7 thus indicates the section in which the ground fault, however slight it may have been, has occurred. Relay 9 operates a switch 106 which is opened when relay 9 is energized, and normally closed by a spring 109, when the relay is deenergized. Switch 106 controls a separate operating circuit which receives its current supply from auxiliary source 2 independent of the supply controlled by switch 11. This second auxiliary circuit includes certain portions of the breaker reclosing device 37 Fig. 1, of which one is provided for the breaker of each line section. This reclosing device is shown in detail in Fig. 2.

When breaker 31 has been opened in the manner aforedescribed, its operating bar closes an auxiliary switch 100, whereby a retarded relay 101 is energized from source 2 by way of switch 106, which is then closed, because the current supply for its relay 9 by way of switch 14 is interrupted, so long as arm 5, by means of pin 115, holds this switch open as described. In case arm 5 has snapped back and switch 14 is closed, no current can flow through relay 9 because switch 11 is open, on account of the removal of the ground, at least for the time being, through opening of breaker 31. After a certain length of time, according to the retardation adjustment, relay 101 closes contacts 102 over which current is now supplied directly from source 2 to reclosing coil 104 whose armature is connected with breaker 31 and which when energized throws breaker 31 back into closing position. If the ground fault in section 22 was only slight and temporary, and was cured by the previously described opening of breaker 31, the breaker remains closed, because in case of no ground, supervising relay 1 remains deenergized and switch 11 remains open so that breaker coil 108 cannot again receive current. If the ground fault in line section 22 should persist, supervising relay 1 will be immediately reenergized and close switch 11, so that current from source 2 can again flow through breaker coil 103, whereby the latter is energized again and breaker 31 is again opened. At this time, however, relay coil 108 receives its current through the detector by way of the drag arm 7 which still stands on the pertaining contact 8 and whose switch 14 has closed in the meantime, since arm 5 had snapped back to the left at the first detection of the fault, and at the first operation of breaker 31. When current is thus supplied to coil 108, it passes by way of contact 8 and relay 9 which only now, for the first time, attracts its armature and opens switch 106. In this energized position this armature is locked by the pawl 107ᵃ, which may later be released by hand. If now contacts 100 are closed (in the open position of breaker 31 as aforementioned) no current can be supplied to relay 101, because switch 106 is now open. Thus the device cannot restore itself to normal condition, as described before, and section 22 remains cut out. The fault is evidently of longer duration than the time for which retarding relay 101 was set (for instance 2 minutes), and it should now be investigated and repaired. When it is removed pawl 107ᵃ can be removed by hand, when spring 109 will raise armature 105 and close switch 106, which will then automatically bring about the reclosing of breaker 31 through energizing of coil 104 and the breaker will then remain closed, since in the absence of a fault relay 1 will not be reenergized and switch 11 will remain open. Of course after the repair of the damaged section and the release of pawl 107ᵃ, the operator will also return drag arm 7 to the left against arm 5, and thus restore the device to readiness for new emergencies.

Let us now return to the position of arms 5 and 7 shown in Fig. 1 and assume that, on the travel of these arms in the direction of the arrow, line section 22 were sound on the arrival of arm 5 on the pertaining A contact, and that the ground fault, which had started the detector arms running, is in a section beyond 22. In that case of course, the contacting of arm 5 with the A contact of section 22 will at first, the same as in case of a fault in that section, bring about the opening of the circuit breaker 31. Since this section is now assumed to be sound, the cause for closing switch 11 is not removed by the opening of breaker 31, and therefore motor 3 continues running and moving arms 5 and 7 further in the direction of the arrow. This interruption of a sound section should of course be of only very short duration, and for this purpose a reclosing contact E for breaker 31 follows immediately the pertaining opening contact A. This contact E is connected by a wire 50 with one end of reclosing coil 104 of the reclosing device 37 shown in detail in Figure 2. After finding section 22 sound and after having caused the opening of breaker 31 by moving onto opening contact A, arm 5 continues its travel and moves onto the pertaining E contact. Thereby is established an auxiliary circuit from the + pole of source 2 by way of switch 11 (which is still closed since the fault was assumed to lie beyond section 22) contact rail 12, arm 5, E contact, line 50, reclosing coil 104, − pole of source 2. This immediately energizes coil 104, which in turn immediately recloses breaker 31, and restores the sound section 22 to its normal condition after an interruption of only very short duration, namely the time it takes arm 5 to travel, without stopping, from the pertaining A contact to the adjacent E contact. Arm 5 now continues traveling to the next A contact to test the next line section 23 for a fault. This section has its pertaining A and E contacts connected to its individual relays, reclosing devices and control circuits similar to those shown for section 22 and before described.

Various modifications and changes may be made without departing from the spirit and the scope of the invention.

I claim as my invention:

1. In a supervising arrangement for an electric line system, having a plurality of line sections and a breaker for each section, a ground indicating device, comprising an opening and a reclosing device for each breaker, means responsive to grounds which may occur in any of said sections, an automatically moving switching device, actuated by said ground responsive means in case of ground occurrence, and having circuit connections for immediately successively actuating the breaker opening and closing devices of each sound line section encountered, an auxiliary control device for the breaker reclosing device of each line section, actuated by its open breaker for energizing the reclosing device of the breaker of a defective line section, and means controlled by said switching device and responsive in case of a ground persistence after reclosing of the breaker by said auxiliary device for reactuating the breaker opening device and for rendering said auxiliary control device inoperative to prevent the reconnection of the defective line section.

2. In a supervising arrangement for an electric line system, having a plurality of line sections and a breaker for each section, a ground indicating device, comprising an opening and a reclosing device for each breaker, means responsive to grounds which may occur in any of said sections, an automatically moving switching device, actuated by said ground responsive means in case of ground occurrence, and having circuit connections for immediately successively actuating the breaker opening and closing devices of each sound line section encountered, an auxiliary control device for the breaker reclosing device of each line section, actuated by its open breaker for energizing the reclosing device of the breaker of a defective line section after a predetermined period of time, and means controlled by said switching device and responsive in case of a ground persistence after reclosing of the breaker by said auxiliary device for reactuating the breaker opening device and for rendering said auxiliary control device inoperative to prevent the reconnection of the defective line section.

3. In a supervising arrangement for an electric line system, having a plurality of line sections and a breaker for each section, a ground indicating device, comprising an opening and a reclosing device for each breaker, means responsive to grounds which may occur in any of said sections, an automatically moving switching device, actuated by said ground responsive means in case of ground occurrence, and having circuit connections for immediately successively actuating the breaker opening and closing devices of each sound line section encountered, an auxiliary control device for the breaker reclosing device of each line section, actuated by its open breaker for energizing the reclosing device of the breaker of a defective line section, and circuit connections controlled by said switching device for reactuating the breaker opening device in case of a ground persistence after said auxiliary device has caused the reclosing of said breaker, and an auxiliary relay in said last-named circuit connections, energized when said breaker is reopened for rendering said auxiliary control devices inoperative, and means for locking said auxiliary relay in energized position to prevent the reconnection of the defective line section.

4. In a supervising arrangement for an electric line system, having a plurality of line sections and a breaker for each section, a ground indicating device, comprising an opening and a reclosing device for each breaker, means responsive to grounds which may occur in any of said sections, an automatically moving switching device, actuated by said ground responsive means in case of ground occurrence, and having circuit connections for immediately successively actuating the breaker opening and closing devices of each sound line section encountered, means for stopping said switching device when a defective line section has been opened by its breaker, an auxiliary control device for the breaker reclosing device of each line section, actuated by its open breaker for energizing the reclosing device of the breaker of a defective line section, and means controlled by said switching device and responsive in case of a ground persistence after reclosing of the breaker by said auxiliary device for reactuating the breaker opening device and for rendering said auxiliary control device inoperative to prevent the reconnection of the defective line section.

5. In a supervising arrangement for an electric line system having a plurality of line sections and a breaker for each section, a ground indicating device comprising an opening and a reclosing relay for each breaker, means responsive to grounds which may occur in any of said sections, an automatically moving switching device actuated by said ground responsive means in case of ground occurrence, and having circuit connections for immediately successively actuating the breaker opening and closing relays of each sound line section encountered, means for stopping said switching device when a defective line section has been opened by its breaker, an auxiliary control device for the breaker reclosing relay of each line section, actuated by its open breaker, for energizing the reclosing relay of the breaker of the defective line section, circuit connections between said switching device and said breaker opening relay, and means for closing said connections when said switching device has stopped, for reopening said breaker in case of a ground persistence after said auxiliary control device has reclosed the breaker, and an auxiliary relay in said last-named circuit connection, energized when said breaker is reopened, for rendering said auxiliary device inoperative, and means for locking said auxiliary relay in energized position to prevent the reconnection of the defective line section.

6. In a supervising arrangement for an electric line system having a plurality of line sections and a breaker for each section, a ground indicating device comprising an opening and a reclosing relay for each breaker, means responsive to grounds which may occur in any of said sections, an automatically moving switching device actuated by said ground responsive means in case of a ground occurrence and having a positively driven switch arm and a drag arm moved by said switch arm, and having contacts and circuit connections with said relays for immediately successively actuating the breaker opening and reclosing relays of each sound line section encountered by said switch arm, means for stopping said switch arm when a defective line section has been opened by its breaker, an auxiliary control device for the breaker reclosing relay of each line section, actuated when its breaker is open for energizing after a predetermined time the reclosing relay of the breaker of a defective line section to reconnect that section, circuit connections including said drag arm and said opening relay of the pertaining defective line for reenergizing said relay to reopen the breaker in case of a ground persistence after said predetermined time, and an auxiliary relay included in said drag arm circuit, energized with said opening relay and having means for rendering said auxiliary control device inoperative, and means for locking said auxiliary relay in energized position to prevent the re-connection of the defective line section.

7. In a supervising arrangement for an electric line system having a plurality of line sections and a breaker for each section, a ground indicating device comprising an opening and a reclosing relay for each breaker, means responsive to grounds which may occur in any of said sections, an automatically moving switching device actuated by said ground responsive means in case of a ground occurrence and having a positively driven switch arm and a drag arm moved by said switch arm, and having contacts and circuit connections with said relays for immediately successively actuating the breaker opening and reclosing relays of each sound line section encountered by said switch arm, means for stopping said switch arm when a defective line section has been opened by its breaker, an auxiliary control device for the breaker reclosing relay of each line section, actuated when its breaker is open, for energizing after a predetermined time the reclosing relay of the breaker of a defective line section to reconnect that section, circuit connections including said drag arm and said opening relay of the pertaining defective line, and effective after the drag arm has stopped, for reenergizing said relay to reopen the breaker in case of a ground persistence after said predetermined time, and an auxiliary relay included in said drag arm circuit, energized with said opening relay and having means for rendering said auxiliary control device inoperative, and means for locking said auxiliary relay in energized position to prevent the re-connection of the defective line section.

In testimony whereof I affix my signature.

ROBERT SCHIMPF.